United States Patent
Lee et al.

(10) Patent No.: US 8,799,558 B2
(45) Date of Patent: Aug. 5, 2014

(54) INDEXING METHOD FOR FLASH MEMORY

(75) Inventors: Jaesoo Lee, Gyeonggi-do (KR); Jung-Sang Ahn, Daejeon (KR); Jin-Soo Kim, Seoul (KR); Dawoon Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 252 days.

(21) Appl. No.: 13/273,501

(22) Filed: Oct. 14, 2011

(65) Prior Publication Data

US 2012/0096216 A1    Apr. 19, 2012

(30) Foreign Application Priority Data

Oct. 14, 2010 (KR) .......... 10-2010-0100464

(51) Int. Cl.
  *G06F 12/00* (2006.01)
  *G06F 7/00* (2006.01)
(52) U.S. Cl.
  USPC ............ 711/103; 707/797; 711/170
(58) Field of Classification Search
  USPC .................. 707/797; 711/103, 170
  See application file for complete search history.

(56) References Cited

U.S. PATENT DOCUMENTS

| | | | |
|---|---|---|---|
| 5,924,088 A * | 7/1999 | Jakobsson et al. ............ | 707/716 |
| 7,457,909 B2 | 11/2008 | Di Sena et al. | |
| 2005/0171960 A1 * | 8/2005 | Lomet ........................... | 707/100 |
| 2008/0263061 A1 | 10/2008 | Nath et al. | |
| 2009/0012976 A1 | 1/2009 | Kang et al. | |
| 2010/0131700 A1 * | 5/2010 | Castillo ........................ | 711/103 |
| 2010/0281063 A1 * | 11/2010 | Ushiyama ..................... | 707/797 |
| 2011/0179085 A1 * | 7/2011 | Hammerschmidt et al. .. | 707/797 |

FOREIGN PATENT DOCUMENTS

KR    1020080056819 A    6/2008

OTHER PUBLICATIONS

On et al. "Flash-Optimized B+-Tree", *Journal of Computer Science and Technology*, 25(3), pp. 509-522, May 2010.
Abraham Silberschatz, "Database System Concepts", Fourth Edition *McGraw Hill*, 2001, pp. 453-464.

\* cited by examiner

*Primary Examiner* — Reginald Bragdon
*Assistant Examiner* — Mehdi Namazi
(74) *Attorney, Agent, or Firm* — Myers Bigel Sibley & Sajovec, PA

(57) ABSTRACT

An indexing method is based on a tree structure of a flash memory, which includes a plurality of pages. The indexing method stores an entry in the leaf node and an entry in an index node designating the leaf node, in the same page, and changes the maximum number of entries that are stored in the leaf node of the page and the maximum number of entries that are stored in the index node of the page on the basis of the number of entries in the leaf node and the number of entries in the index node, respectively.

14 Claims, 16 Drawing Sheets

INDEXING METHOD FOR FLASH MEMORY

CROSS-REFERENCE TO RELATED APPLICATIONS

This U.S. non-provisional patent application claims priority under 35 U.S.C. §119 of Korean Patent Application No. 10-2010-0100464, filed on Oct. 14, 2010, the entire contents of which are hereby incorporated by reference.

BACKGROUND

The present disclosure herein relates to a flash memory, and, more particularly, to an indexing scheme for a flash memory.

Flash memory devices are non-volatile memory devices that do not require power to retain information stored in the memory chip. In addition, although not as fast as dynamic random access memory (DRAM) devices that are used as the main memories for personal computers, flash memory devices offer generally fast read speeds and better shock resistance than hard disks. Due to these characteristics, flash memories are widely used as storage devices in battery-operated devices. Another feature of flash memories is their virtual indestructibility against physical elements such as extreme pressure and boiling water.

Flash memory devices are non-volatile computer memory devices capable of electrically erasing and rewriting data. Unlike electrically erasable programmable read-only memories (EEPROM), flash memory devices are capable of erasing and writing in block units. Because flash memory devices cost less than EEPROMs, they are generally used wherever a significant amount of non-volatile, solid state storage is needed. Representative applications include digital audio players, digital cameras, and mobile phones. Flash memory devices are also used in USB drives that are widely used for general data storage and transfer of data between computers.

Increasing the speed of hard disks is structurally difficult because they mechanically drive magnetic disks to read/write data. Ongoing efforts have recently begun to use flash memories instead of hard disks as large capacity storage devices. In particular, when a boot code is stored in a flash memory device, the booting speed of the system becomes faster.

SUMMARY

The present disclosure provides an indexing method for a flash memory, which leads to enhancement in performance and durability.

Embodiments of the inventive concept provide an indexing method based on a tree structure of a flash memory including a plurality of pages, including: receiving a correction command for a leaf node and storing an entry in the leaf node and an entry in an index node designating the leaf node in the same page. The tree structure includes the leaf node and the index node, and the storing of the entry changes the maximum number of entries that are stored in the leaf node of the page and the maximum number of entries that are stored in the index node of the page on the basis of the number of entries in the leaf node and the number of entries in the index node, respectively.

In some embodiments, the flash memory may be read and/or written in page units.

In other embodiments, the index node may designate at least one leaf node.

In still other embodiments, when a plurality of index nodes are included in the page, a top node among the index nodes may be a root node.

In even other embodiments, when the correction command is a command indicating inserting of a new entry into the leaf node, the storing of an entry may further include: determining whether the leaf node is full; dividing the leaf node into first and second leaf nodes when the leaf node is full; and inserting the new entry into one of the divided first and second leaf nodes.

In yet other embodiments, the storing of an entry may further include: determining whether the index node is full when the leaf node is divided into the first and second leaf nodes; determining whether the leaf node has a free space for storing the new entry when the index node is full; and changing the maximum number of entries which are stored in the leaf node of the page and the maximum number of entries which are stored in the index node of the page at a predetermined change ratio when the leaf node has the free space.

In further embodiments, the storing of an entry may further include: dividing the index node when the index node is full and the leaf node has no free space for storing the new entry; and counting the number of divisions of the index node.

In still further embodiments, the storing of an entry may further include: counting the number of divisions of the index node when the leaf node is divided; determining whether a ratio of the number of divisions of the index node and the number of divisions of the leaf node is greater than a predetermined value; determining whether the leaf node has the free space for storing the new entry when the ratio of the number of divisions of the index node and the number of divisions of the leaf node is not greater than the predetermined value; and changing the maximum number of entries that are stored in the leaf node of the page and the maximum number of entries that are stored in the index node of the page to increase the maximum number of entries that are stored in the index node when the leaf node has the free space.

In even further embodiments, the determining of the ratio of the number of divisions may include determining whether (the number of divisions of the index node)/(the number of divisions of the leaf node) is greater than (1−a size ratio of the leaf node)/(a size ratio of the leaf node).

In yet further embodiments, when the correction command is a command indicating deleting of an entry from the leaf node, the storing of an entry may further include: determining whether the leaf node becomes empty due to the deletion of the entry; deleting the leaf node when the leaf node becomes empty; determining whether a use ratio of the root node is less than a reference value; and changing the maximum number of entries that are stored in the leaf node of the page and the maximum number of entries that are stored in the index node of the page to increase the maximum number of entries that are stored in the leaf node when the use ratio of the root node is less than the reference value.

In yet further embodiments, the determining of a use ratio may include determining whether the number of entries stored in the root node is less than 50% of the maximum number of entries stored in the root node.

In much further embodiments, a size ratio the leaf node occupies in the page may be equal to or less than a first value and be equal to or greater than a second value, and the storing of an entry may include changing the maximum number of entries that are stored in the leaf node of the page and the maximum number of entries that are stored in the root node of the page to change the maximum number of entries that are stored in the leaf node in the range from the first value to the second value.

In still much further embodiments, each of the plurality of pages may store the maximum number n (n is a positive integer) of entries of the leaf node and the maximum number n (n is a positive integer) of entries of the index node.

In other embodiments of the inventive concept, a system includes: a flash memory including a plurality of pages; and a processor accessing the flash memory, wherein the processor performs the indexing method.

In still other embodiments of the inventive concept, a system includes: a solid state disk (SSD) including a plurality of pages; and a processor accessing the SSD, wherein the processor stores data of a leaf node and data of an index node designating the leaf node, in the same page.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE EMBODIMENTS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Hereinafter, exemplary embodiments of the inventive concept will be described in detail with reference to the accompanying drawings.

As a tree structure, which is modified from a B-tree, a μ-tree includes a leaf node and an index node. Each of the leaf node and index node includes an entry including a key and a pointer. A key value may be aligned in ascending order. The leaf node includes a pointer designating a position in which data corresponding to each key is stored. The index node includes a pointer for rapidly searching a key value in the leaf node. In the μ-tree, the leaf node configures a linked list in sequential order and, therefore, the key value may be sequentially processed, unlike in the B-tree. Such a μ-tree may be widely used as an index for accessing a data base or data stored in a storage medium such as a hard disk.

The present disclosure provides various embodiments of a new μ-tree.

Figure 1:
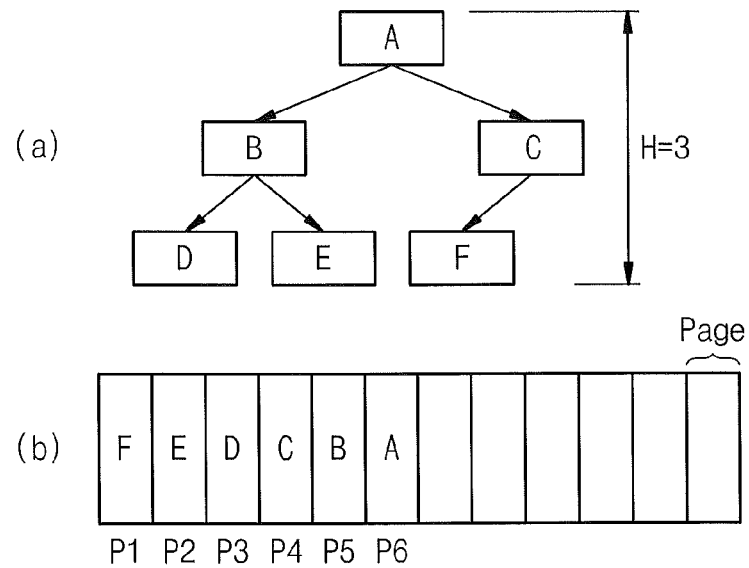
FIG. 1 is a diagram that illustrates an example of a flash memory storing a general B+ tree structure.

FIG. 1 is a diagram illustrating an example of a flash memory storing a general B+ tree structure.

The B+ tree (a) of FIG. 1 has a height H of three, three leaf nodes, and three index nodes. In other words, the leaf nodes are D, E, and F, and the index nodes are B, C, and A. The top index node A among the index nodes is referred to as a root node. When the B+ tree has a height of one, "root node=leaf node." When the B+ tree has a height of more than or equal to two, "root node=index node."

Each index node includes key values and pointers. For example, the index node A includes a page address P5 of an index node B and a page address P4 of an index node C, and the index node B includes a page address P3 of a leaf node D and a page address P2 of a leaf node E.

The index nodes and leaf nodes of the B+ tree (a) are stored in pages of the flash memory (b). In general, flash memories are erased in block units and read/written in page units.

Figure 2:
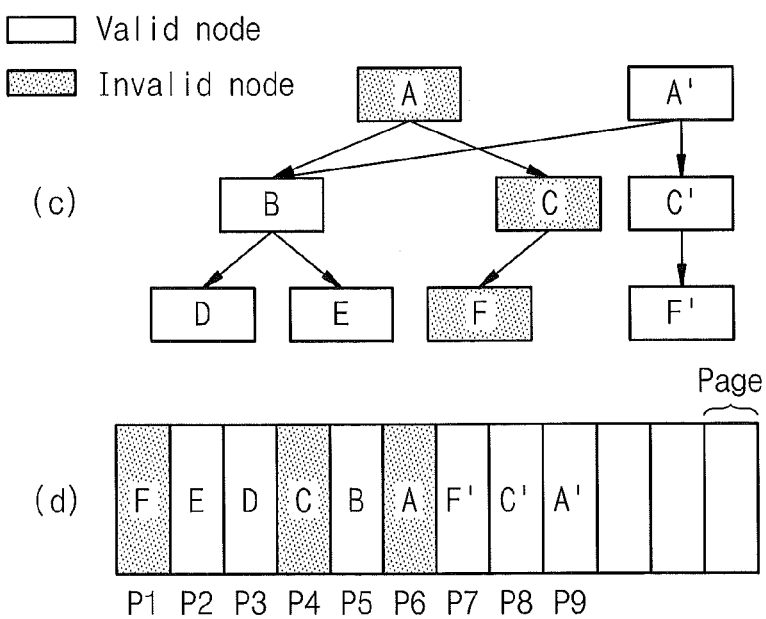
FIG. 2 is a diagram that illustrates an example of a flash memory storing the changed B+ tree structure after one of leaf nodes is corrected in the B+ tree structure.

FIG. 2 illustrates an example of a flash memory storing the changed B+ tree structure after one of the leaf nodes is corrected in the B+ tree structure.

In flash memories, an erasing operation is typically performed for writing new data in a cell where data has already been written. To write new data without the erasing operation, however, the data is required to be written in a previously deleted new page. To insert/delete a key value into/from a leaf node F of the B+ tree, accordingly, a corrected leaf node F' is written in a new page P7 of the flash memory (d). An index node C is corrected to an index node C' to designate the page P7 of the leaf node F'. Also, an index node A is corrected to an index node A' to designate the page P8 of the index node C'. In this way, correction of the leaf node F causes correction of the index nodes C and A related to the leaf node F. That is, to correct, insert, or delete one of the leaf nodes, a writing operation is performed at least a number of times equal to a height H of the B+ tree.

In NAND flash memories, because a writing operation takes more time than a reading operation, and the number of writings for each block is limited, it not only takes a lot of time in correcting an indexing structure, but the service life of the NAND flash memory may also be shortened.

Figure 3:
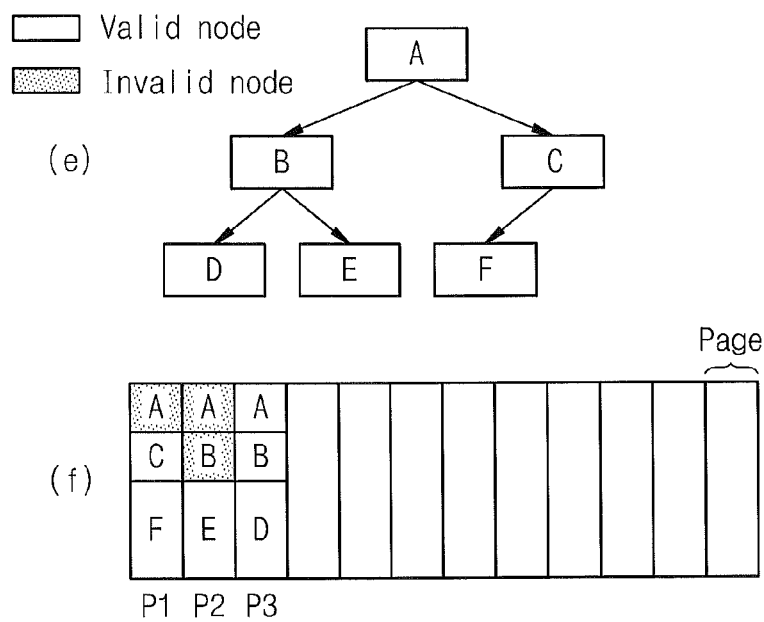
FIG. 3 is a diagram that conceptually illustrates a new scheme for storing a μ-tree in a flash memory according to an embodiment of the inventive concept.

FIG. 3 conceptually illustrates a new scheme for storing a μ-tree in a flash memory according to an embodiment of the inventive concept.

Referring to FIG. 3, a leaf node and index nodes related to the leaf node are written in the same page in the μ-tree (e). That is, a leaf node F and index nodes C and A that are parent nodes of the leaf node F are stored in a page P1, a leaf node E and index nodes B and A are stored in a page P2, and a leaf node D and index nodes B and A are stored in a page P3. When the leaf node E and index nodes B and A are stored in a page P2, however, the index node A stored in the page P1 becomes invalid because the index node A designates the page storing index nodes B and C. Likewise, when the leaf node D and index nodes B and A are stored in the page P3, the index node B stored in the page P2 becomes invalid because the pointer of the index node A designates the pages P1 and P2 storing index nodes C and B, and the pointer of the index node B designates the pages P3 and P2 storing index nodes D and E. That is, access to the index node B stored in the page P2 does not happen. In other words, since a search is made in the order from the index node A (that is a root node of the last page P3) to child nodes, actual access is not made to the index node A that is stored in the page P1 and the index nodes A and B stored in the page P2.

Figure 4:
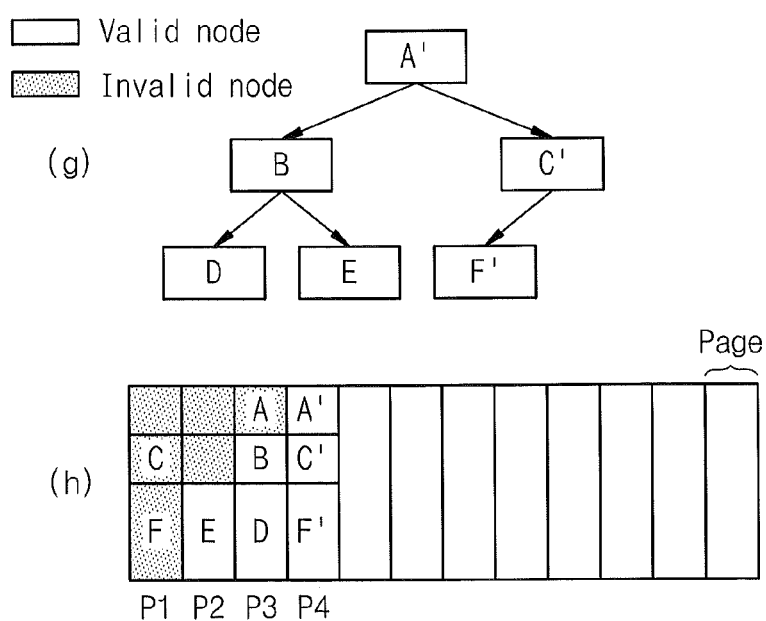
FIG. 4 is a diagram that conceptually illustrates a scheme for correcting a leaf node of the μ-tree stored in the flash memory of FIG. 3, according to an embodiment of the inventive concept.

FIG. 4 conceptually illustrates a scheme for correcting a leaf node of the μ-tree stored in the flash memory of FIG. 3 according to an embodiment of the inventive concept.

Referring to FIG. 4, the index nodes C and A are also corrected for correcting the leaf node F. When the corrected leaf node F' is stored in a new page P4, the index node C that has designated the leaf node F' is corrected to an index node C' that corrects its pointer to designate the page P4 instead of the page P1, and the index node A is corrected to an index node A' that corrects its pointer for designating the index node C'. Herein, the prime symbol (') denotes that a key value/pointer of a leaf/index node has been corrected.

The corrected nodes F', C', and A' are stored in the page P4. That is, to correct one leaf node F, a write operation on only one page P4 is performed. Therefore, the time taken in a correcting operation on a leaf node can be shortened, and the use of a NAND flash memory can be minimized. According to the indexing scheme of the inventive concept, the number of writings for a flash memory may be minimized, and thus the service life of the flash memory can be extended.

When a search for a leaf node is performed in the flash memory (h) of FIG. 4, a search is made in the order from the root node A' to child nodes stored in the last page P4. That is, the index node A' designates the index nodes B and C', the index node B designates the leaf nodes D and E, and the index node C' designates the index nodes F'. Such indexing scheme for a flash memory of the inventive concept is suitable for a searching scheme of a μ-tree.

Figure 5:
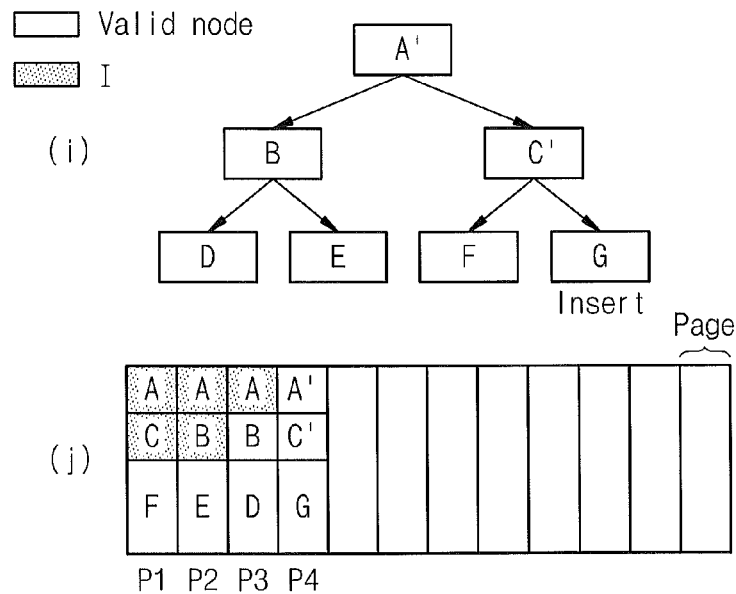
FIG. 5 is a diagram that conceptually illustrates a scheme for inserting a new leaf node into the μ-tree stored in the flash memory of FIG. 3, according to an embodiment of the inventive concept.

FIG. 5 conceptually illustrates a scheme for inserting a new leaf node into the μ-tree stored in the flash memory of FIG. 3 according to an embodiment of the inventive concept.

When a leaf node G is inserted, the parent nodes (i.e., index nodes C and A) related to the leaf node G are corrected. Referring to FIG. 5, the leaf node G inserted into a μ-tree (i) and the corrected index nodes C' and A' are stored in the page P4 of a flash memory (j). The corrected index node C' includes pointers for designating the page P1 where the leaf node F is stored and the page P4 where the leaf node G is stored.

In this way, an inserting operation of a new leaf node may be also performed through one-time writing operation. If the index node C' is full after the insertion of the new leaf node G, split of the index node C' is performed. It will be described in detail below.

Figure 6:
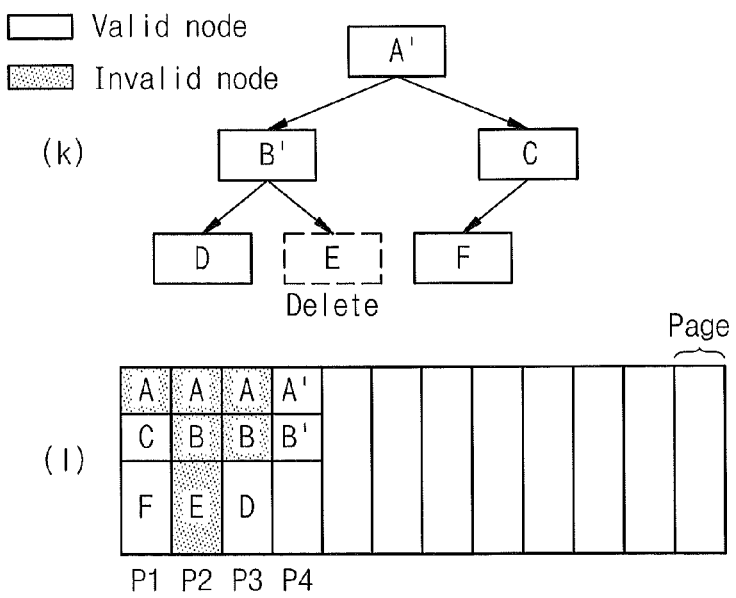
FIG. 6 is a diagram that conceptually illustrates a scheme for deleting a leaf node of the μ-tree stored in the flash memory of FIG. 3, according to an embodiment of the inventive concept.

FIG. 6 conceptually illustrates a scheme for deleting a leaf node of the μ-tree stored in the flash memory of FIG. 3, according to an embodiment of the inventive concept.

Referring to FIG. 6, to delete a leaf node E from a μ-tree (k), parent nodes (i.e., index nodes B and A) related to the leaf node E are corrected. The corrected index nodes B' and A' related to the leaf node E that is deleted from the μ-tree (k) are stored in the page P4. The corrected index node B' designates the page P3 storing the leaf node D, and the corrected index node A' designates the corrected index node B' and the index node C. The corrected index nodes A' and B' are stored in the page P4 of a flash memory (l).

Figure 7:
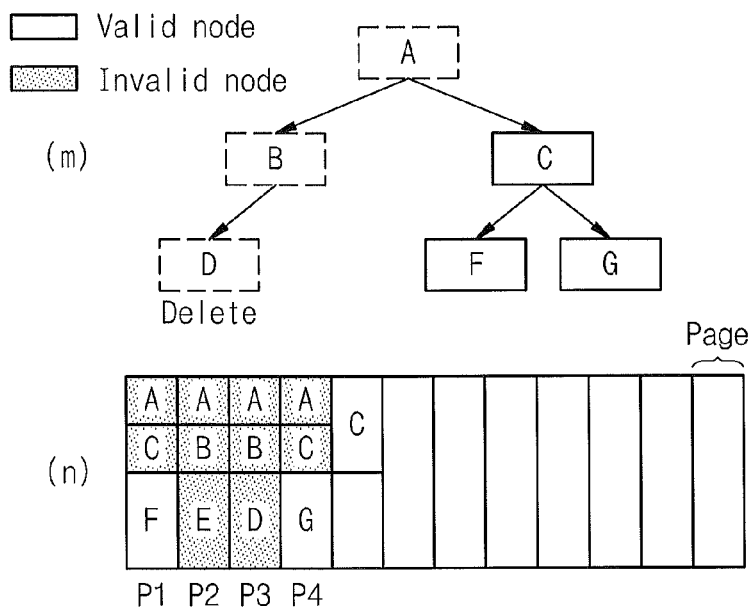
FIG. 7 is a diagram that conceptually illustrates a scheme for deleting a leaf node of the μ-tree stored in the flash memory of FIG. 6, according to an embodiment of the inventive concept.

FIG. 7 conceptually illustrates a scheme for deleting a leaf node of the μ-tree stored in the flash memory of FIG. 6 according to an embodiment of the inventive concept.

To delete a leaf node D from a μ-tree (m), parent nodes (i.e., index nodes B and A) related to the leaf node D are corrected. Referring to FIG. 7, when deleting the leaf node D from a μ-tree (m), the index node B does not designate any leaf node. Therefore, the index node B with no child nodes is deleted. Because the index node A being a root node designates only the page P5 where the index node C is stored, the index node C may be corrected to a root node. That is, the index node C is changed to the root node, thus designating the pages P1 and P4 where the leaf nodes F and G are stored.

As illustrated in FIGS. 6 and 7, an operation of deleting a leaf node may be achieved by performing a one-time writing operation on a flash memory. The time taken in a deleting operation of a leaf node can be shortened, and the use of a flash memory can be minimized. The indexing scheme of the inventive concept may reduce or minimize the number of writings for a flash memory, thereby extending the service life of the flash memory.

As described above, correction, insertion, or deleting of a leaf node of the μ-tree is sequentially performed in the order from a leaf node to a root node, and non-leaf nodes (i.e., index nodes) related to the corrected, inserted, or deleted leaf node are stored in one page. Accordingly, each page of a flash memory is designed to store all nodes from a leaf node to a root node.

Figure 8:
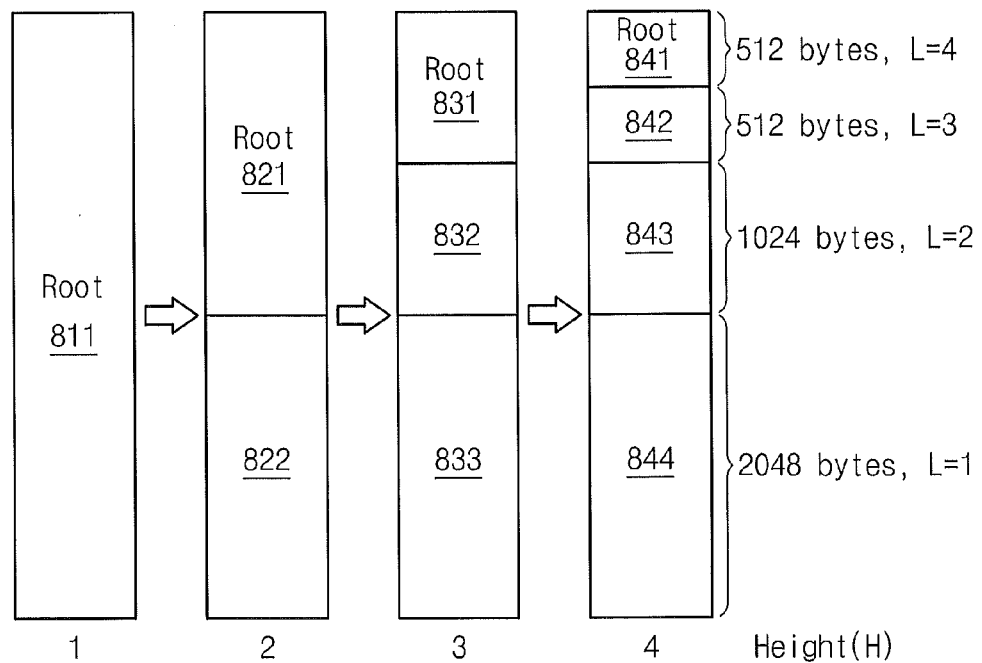
FIG. 8 is a diagram that illustrates changes in maximum storage capacity of the leaf/index node stored in one page according to an increase in height according to an embodiment of the inventive concept.

FIG. 8 illustrates changes in maximum storage capacity of a leaf/index node stored in one page according to an increase in height H.

Referring to FIG. 8, the maximum storage capacity of the leaf/index node changes according to an increase in height H. In a case where the size of each page of a flash memory is 4096 bytes, the size of an index node (that is a root node) 811 is 4096 bytes when the height H is 1. Each size of an index node 821 (that is a root node) and a leaf node 822 is 2048 bytes when the height H is 2. Each size of an index node 831 (that is a root node) and an index node 832 is 1024 bytes, and the size of a leaf node 833 is 2048 bytes when the height H is 3.

Each size of an index node 841 (that is a root node) and an index node 842 is 512 bytes, the size of a index node 843 is 1024 bytes, and the size of a leaf node 844 is 2048 bytes when the height H is 4.

According to an increase in height, the sizes of leaf nodes 822, 833, and 844 is maintained at 2048 bytes, and the sizes of root nodes 811, 821, and 831 decrease by ½. It can be seen that the maximum height of a μ-tree is determined according to the data size of a root node and the page size of a flash memory when the μ-tree is stored in the flash memory.

Also, the maximum size of each index/leaf node depends on levels in one tree. For example, when the height H is 4, the maximum size of a 4-level leaf node 844 is 2048 bytes, the maximum size of a 3-level index node 843 is 1024 bytes, the maximum size of a 2-level index node 842 is 512 bytes, and the maximum size of a 1-level root node 841 is 512 bytes.

In an example of FIG. 8, a size ratio of the root node and the index node directly below the root node is 1:1. For example, the size ratio of the root node 821 and the index node 822 is 1:1 when the height H is 2, the size ratio of the root node 831 and the index node 832 is 1:1 when the height H is 3, and the size ratio of the root node 841 and the index node 842 is 1:1 when the height H is 4.

The layout of a page size is expressed as Equation (1).

$$N_L \begin{cases} P & \text{if a single level}(H = 1); \\ P \cdot \left(1 - \sum_{i=1}^{L-1} p_i\right) & \text{otherwise root}(L = H \text{ and } H > 1); \\ P \cdot P_L \end{cases} \quad (1)$$

where P is the page size, H is the tree height, L is a level, $N_L$ is a size each L-level node occupies in the page, and $p_L$ is a size ratio of L-level node size relative to the page size. Herein, L is equal to or greater than 1 and equal to or less than H. A node of which L is 1 is a leaf node, and a node of which L is H is a root node. In FIG. 8, the $p_L$ of the μ-tree is $(½)^{L-1}$. Because $p_L$ is fixed to $(½)^{L-1}$, layouts of all pages are maintained the same while the tree height H is kept the same.

The present disclosure provides a method of changing a page layout when the number of entries stored in the page is changed, regardless of changes in height H. The change of the page layout is for delaying or minimizing the increase in tree height H. If the tree height H increases, loads required for reference, updating, and garbage collection increase rapidly.

First, a theoretical method of determining the optimum page layout for the number of entries stored in a page will be described below.

When the tree height H and the size ratio $p_1$ of a first level (i.e., the size ratio of a leaf node) are provided, the method of finding the optimum size ratio of other levels is as follows: The total number $n_I$ of entries included in all nodes from a root node to a 2-level node is expressed as Equation (2).

$$n_I = f^{(H-1)} \prod_{L=2}^{H} p_L \quad (2)$$

where $f_H$ is the maximum number of entries which may be stored in one page of a flash memory. In the μ-tree, all nodes from a root node to a leaf node are stored in one page. Therefore, Equation (3) is satisfied.

$$\prod_{L=2}^{H} p_L = p_1 \quad (3)$$

Using Equations (2) and (3) and AM-GM inequality, as expressed in Equation (4), it can be seen that $n_I$ is the maximum when the size allocated to each level node in one of pages is the same.

$$p_2 = p_3 = \ldots = p_L = \frac{1 - p_1}{H - 1} \quad (4)$$

The total number n of entries stored in a tree of which the height is H is expressed as Equation (5).

$$n = p_1 \cdot \left(\frac{1 - p_1}{H - 1}\right)^{H-1} \cdot f^H \quad (5)$$

The minimum tree height h necessary for accommodating the given total number n of entries is expressed as Equation (6).

$$h = \left[e^{W_{-1}\left(\frac{\log p_1 + \log f - \log n}{e^{\log(1-p_1) + \log f}}\right) + \log(1-p_1) + \log f}\right] + 1 \quad (6)$$

where $W_{-1}$ is the Lambert W function when K=−1.

The number of garbage collections is affected by the tree height and the number of pages the tree occupies in a flash memory. Therefore, the optimum page layout design is required for minimizing the garbage collection. That is, the number of garbage collections may be reduced until the number of pages the tree occupies and the height of the tree are minimized. To minimize the number of pages a tree occupies, however, the size in a page a leaf node occupies in a page is required to be maximized, for which the size of an index node being an intermediate node is required to be reduced, thus increasing the height of the tree. Accordingly, an appropriate balance is required between the number of pages a tree occupies and the height of the tree.

In the inventive concept, the optimum page layout is determined by the following three rules, based on characteristics in which (1) when the size ratio $p_1$ a leaf node occupies in a page is greater than 0.5, the number of entries in the leaf node is two times or less than the optimum entry number, and (2) the height of the tree further affects the garbage collection cost.

(1) The minimum tree height h is determined to the minimum value that satisfies Equation (6) for the number of entries that is given when $p_1$=0.5.

(2) $p_1$ is required to satisfy Equation (5) for the number n of entries and the minimum height h of the tree.

(3) $p_L$ (1<L≤H) is determined by Equation (4).

The optimum $p_1$ may be obtained according to the above rules.

Figure 9:
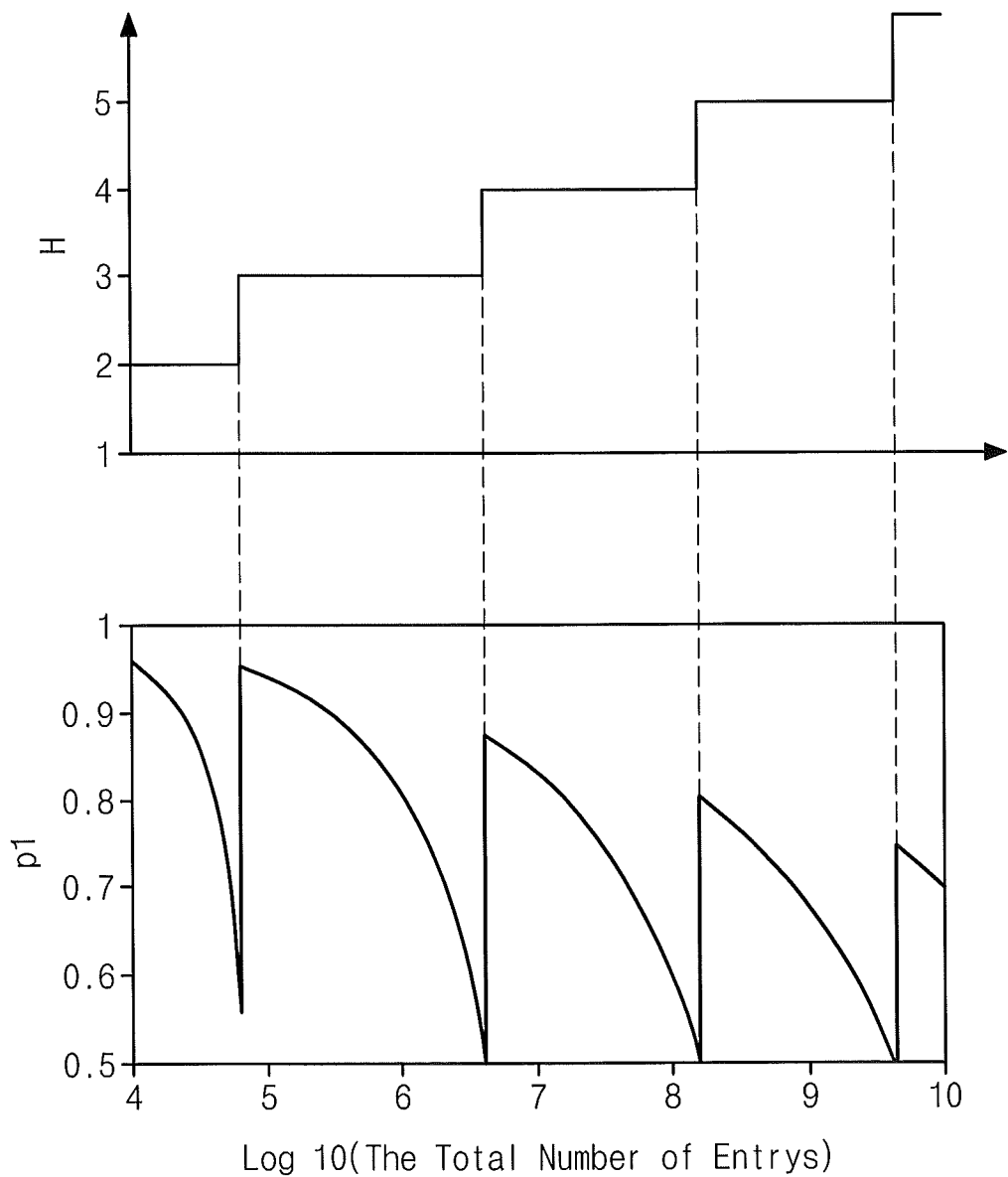
FIG. 9 is a diagram that shows the optimum value of the size ratio a leaf node occupies in a page according to an embodiment of the inventive concept.

FIG. 9 is a diagram showing the optimum value of the size ratio $p_1$ a leaf node occupies in a page.

Referring to FIG. 9, the tree height H is 2, and with the increase in the number of entries in the tree, the size ratio $p_1$ occupied by a leaf node decreases progressively. When the size ratio $p_1$ the leaf node occupies decreases, the size ratio of a root node increases. The size ratio $p_1$ the leaf node occupies decreases to approximately 0.5, and then, when the tree height H increases to 3, $P_L$ of the minimum value satisfying Equation (4) is set, and thus the size ratio $p_1$ the leaf node occupies becomes maximum. In this way, the size from a leaf node to a root node in one page (i.e., page layout) is determined.

Because the above-described page layout determining method is based on the assumption that the total number of entries stored in a tree is fixed, it is difficult to predict the number of entries at an environment where a flash memory actually operates. Accordingly, the inventive concept provides a method for adaptively changing a page layout according to the change in the number of entries. However, layouts of all pages in a tree are not corrected, but only layouts of the pages newly written through insertion, deletion, and correction are changed.

Parameters that are used to change a page layout of a tree are α, β, and γ. Herein, α and β are the maximum value and minimum value of the size ratio $p_1$ a leaf node occupies, respectively. That is, the size ratio $p_1$ the leaf node occupies is changed in the range β≤$p_1$≤α. There are two cases in which a page layout is changed. One of the two cases is the case in which an entry is inserted into a leaf node, and the other is the case in which an entry is deleted from a leaf node.

Figure 10A:
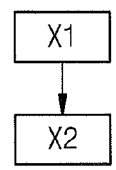
FIGS. 10A to 10C are diagrams that illustrate a change of a page layout when a new entry is inserted into a leaf node according to an embodiment of the inventive concept.
Figure 10B:
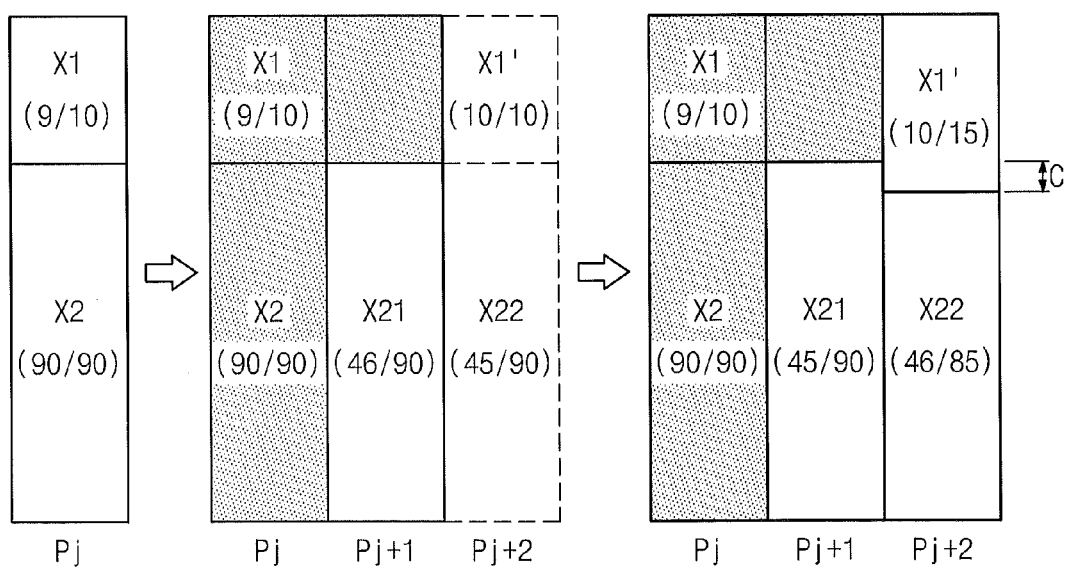
Figure 10C:
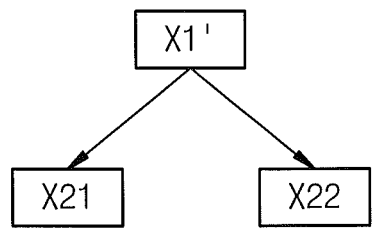
Figure 11:
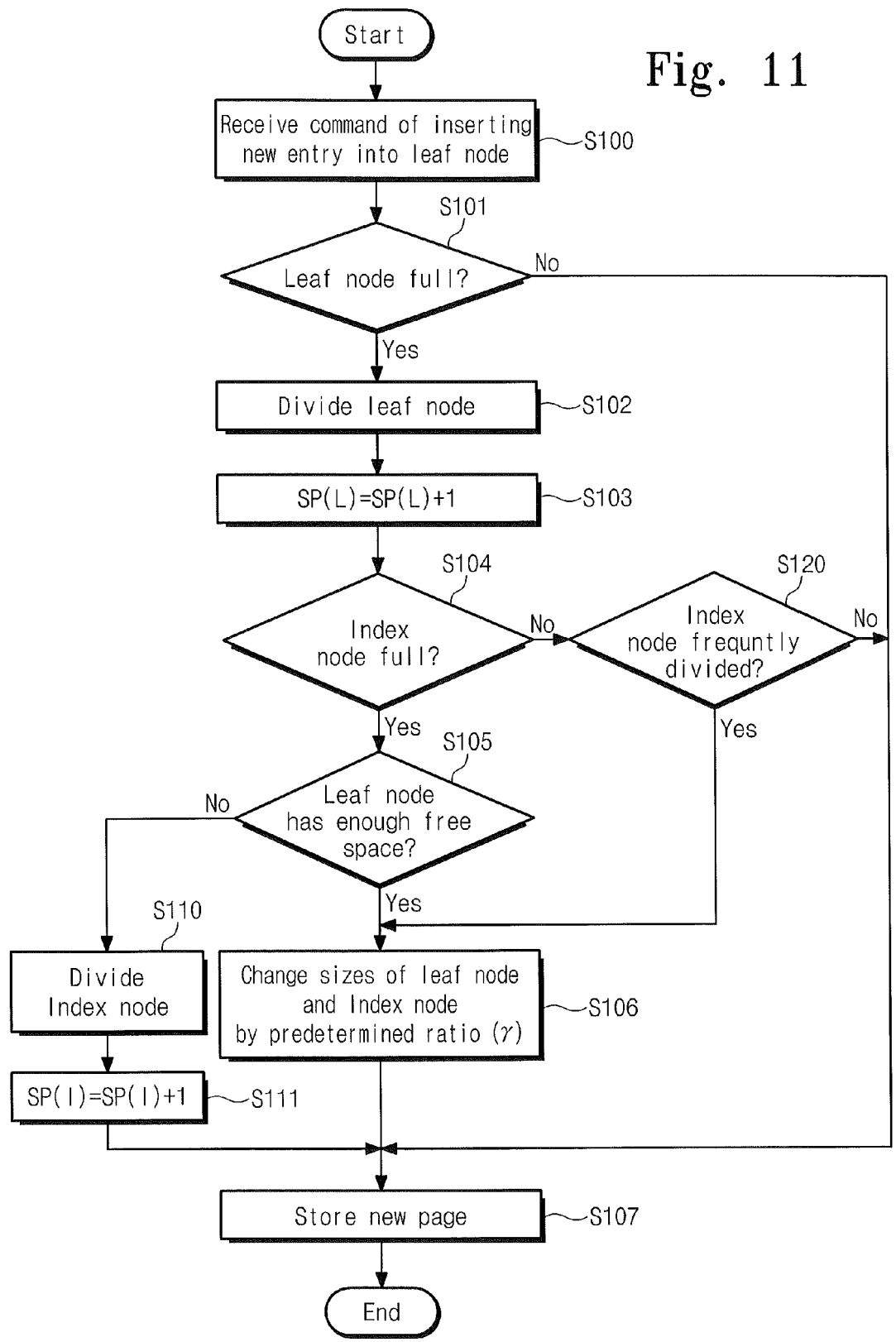
FIG. 11 is a flowchart that illustrates an operation of inserting a new entry into a leaf node of a flash memory according to an embodiment of the inventive concept.

FIGS. 10A to 10C illustrate a change of a page layout when a new entry is inserted into a leaf node. FIG. 11 is a flowchart illustrating an operation of inserting a new entry into a leaf node of a flash memory.

FIG. 10A illustrates an example of a new μ-tree (hereinafter referred to as μtree) according to embodiments of the inventive concept including an index node and a leaf node. FIG. 10B is a diagram conceptually illustrating a change process of a page layout when a new entry is inserted into a leaf node X2 of a μ-tree.

Referring to FIGS. 10A, 10B, and 11, the μ-tree includes an index node X1 and a leaf node X2. The size ratio $p_1$ the leaf node occupies in the page $P_j$ is 0.9. That is, the index node X1 may store a maximum of ten entries, and the leaf node X2 may store a maximum of ninety entries. In an example of FIG. 10, the leaf node X2 is full.

When a command indicating the inserting of a new entry into the leaf node X2 is received in operation S100, the device performing the indexing method of a flash memory determines whether the leaf node X2 is full. If the leaf node is full in operation S101, the leaf node X2 is required to be divided in operation S102. The leaf node X2 is divides into leaf nodes X21 and X22. An index node X1' is required to designate all the leaf nodes X21 and X22. At this point, the index node X1' designates the new leaf node X22, and thus the index node X1' become full. In a typical μ-tree, when an index node is full, the height is increased. In the μ*-tree of the inventive concept, when the index node X1' is full in operation S104, whether a free space exists in the leaf node X22 into which the new entry has been inserted is determined in operation S105. When the leaf node X22 has sufficient free space, the size of the leaf node X22 is decreased, and the size of the index node X1' is increased by a predetermined change ratio γ in operation S106. As an example, when the maximum number of entries storable in a page $p_{j+i}$ is 100 and the change ratio γ is 0.05, the size of the leaf node decreases by 5 (c), and the size of the index node X1' increases by 5.

The sizes of the index node X1' and leaf node X22 in a new page $P_{j+2}$ are changed, and then each entry of the index node X1' and leaf node X22 is stored in the page $P_{j+2}$ in operation S107.

If the leaf node X22 does not have sufficient free space, the index node X1' is divided, and thus the height increases by 1 in operation S110.

As described above, in the inventive concept, the change in the page layout is applied to only the page including the leaf node in which an entry is corrected, or an entry is newly inserted. If a large amount of entries are inserted into a leaf node at one time, division of an index node may be rapidly performed, and thus the tree height increases much faster than an expected value. This is because only the layout of the page including the changed leaf node is corrected, and the layouts of the remaining pages are maintained as is. Therefore, when an index node is frequently divided, a page layout is required to be pre-adjusted for delaying the increase in tree height.

The μ*-tree having a height of 2 is described as an example in FIGS. 9A and 9B, but the inventive concept may be applied to the μ*-tree having an arbitrary height other than 2. When the μ*-tree has a height of 3 or more, at least one index node, a root node, and a leaf node are included in one page. When the leaf node is divided, the index node is full, and thus the index node may be divided. At this point, as described above, the sizes of the root node, index node, and leaf node are changed by a predetermined change ratio γ.

As illustrated in FIG. 11, whenever a leaf node is divided, the number SP(L) of divisions of the leaf node is counted in operation S103. Also, whenever an index node is divided, the number SP(I) of divisions of the index node is counted in operation S111. In operation S104, even when the index node is not full but frequently divided in operation S120, operation S106 is performed to change the page layout. When the leaf node X22 has a sufficient free space, the size of the leaf node X22 is decreased, and the size of the index node X11 is increased by a predetermined change ratio γ in operation S106. Whether the index node is frequently divided is determined through Equation (7).

$$\frac{SP(I)}{SP(L)} > \frac{1-p_1}{p_1} \quad (7)$$

That is, when the ratio of the number SP(I) of divisions of the index node and the number SP(L) of divisions of the leaf node is greater than the ratio of the size ratio 1−$p_1$ of the index node and the size ratio $p_1$ of the leaf node in the page, the index node is determined as being frequently divided.

FIG. 10C is a diagram illustrating the changed μ*-tree after the entry inserting operation of FIG. 10B. It can be seen that the page layout has been changed after the entry inserting operation of FIG. 10B, but the structure of the μ*-tree is maintained as it is.

In this way, when a new entry is inserted into a leaf node, or an entry of a leaf node is corrected, a page layout may be set to maximally delay an increase in a tree height.

Figure 12A:
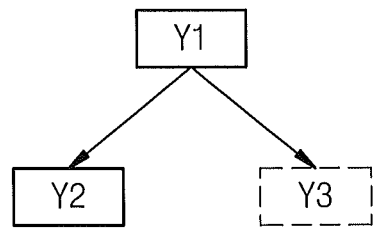
FIGS. 12A to 12C are diagrams that illustrate a change of a page layout when an entry is deleted from a leaf node according to an embodiment of the inventive concept.
Figure 12B:
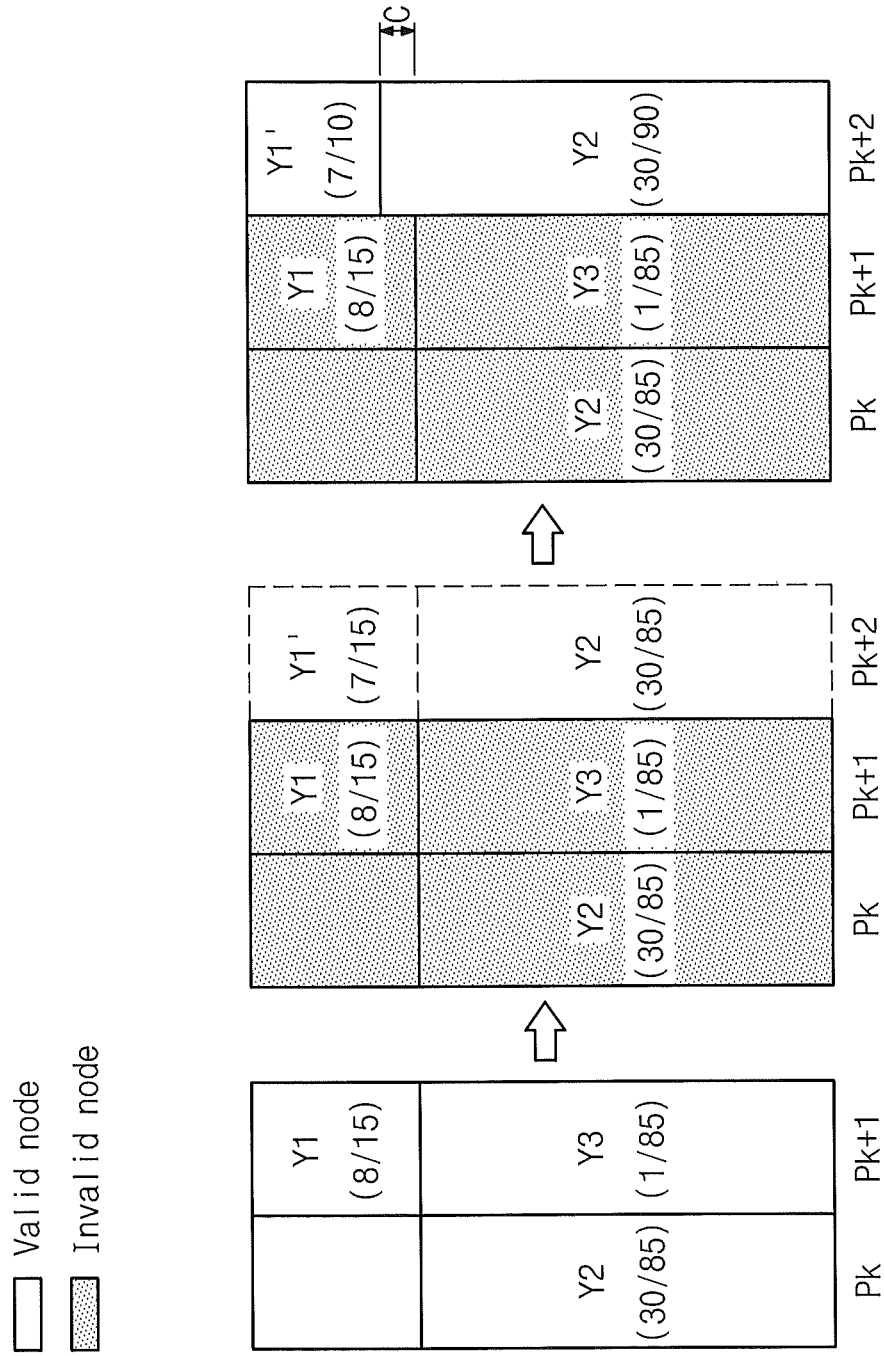
Figure 12C:
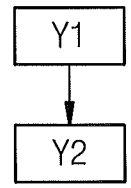
Figure 13:
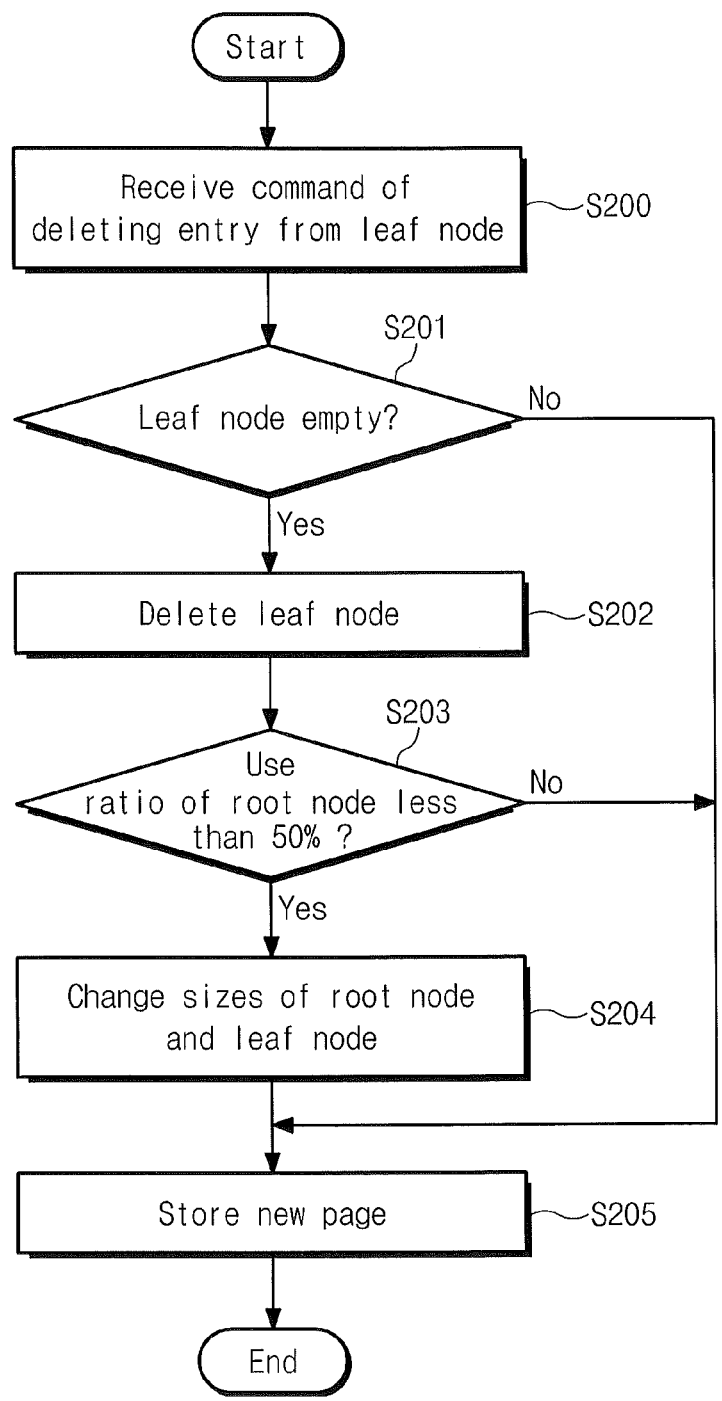
FIG. 13 is a flowchart that illustrates an entry deleting operation in a leaf node of a flash memory.

FIGS. 12A to 12C illustrate a change of a page layout when an entry is deleted from a leaf node. FIG. 13 is a flowchart illustrating an entry deleting operation in a leaf node of a flash memory.

FIG. 12A illustrates an example of the μ*-tree having a height of 2 according to an embodiment of the inventive concept. FIG. 12B is a diagram conceptually illustrating a change process of a page layout when an entry is deleted from a leaf node of the μ*-tree of FIG. 12A.

Referring to FIGS. 12A, 12B, and 13, the μ*-tree includes a root node Y1, and leaf nodes Y2 and Y3. The size ratio $p_1$ the leaf node Y2 occupies in a page $P_k$ and the size ratio $p_1$ the leaf node Y3 occupies in a page $P_{k+1}$ are 0.85. That is, the root node Y1 may store a maximum of fifteen entries, and the leaf nodes Y2 and Y3 may store a maximum of eighty-five entries. In an example of FIG. 12B, only one entry is stored in the leaf node Y3.

Referring to FIGS. 12B and 13, the device performing the indexing method of a flash memory receives a command indicating the deleting of an entry from the leaf node Y3 in operation S200. Because only one entry is stored in the leaf node Y3, the entire leaf node Y3 is deleted when the entry is deleted. When the leaf node Y3 becomes empty due to the entry deletion in operation S201, the leaf node Y3 is deleted in operation S202. The leaf node Y3 is deleted, and thus the number of entries in the corrected root node Y1' decreases from 8 to 7.

When a use ratio of the leaf node is less than a predetermined ratio (for example, 50%) in operation S203, the sizes of the root node and leaf node are changed by a predetermined ratio γ in operation 5204. The root node Y1 has included eight entries, but the corrected root node Y1' includes only seven entries. Because the corrected root node Y1' may store a total of fifteen entries, less than 50% of the corrected root node Y1' is being used. Accordingly, the size of the corrected root node Y1' decreases by a predetermined ratio c, and the size of the leaf node Y2 increases by a predetermined ratio γ. The size-changed root node Y1' and the leaf node Y2 is stored in a new page $P_{k+2}$ in operation S205. With the increase in size of the leaf node Y2, the increase in height may be suppressed to the utmost. In this embodiment, when the number of entries that may be stored in one page is 100 and the size change ratio γ is 0.05, the size of the corrected root node Y1' decreases by 5 to 10, and the size of the leaf node Y2 increases by 5 to 90.

FIG. 12C is a diagram illustrating the changed μ*-tree after the entry deleting operation of FIG. 12B. After the entry deleting operation of FIG. 10B, the structure of the μ*-tree has been changed to that of having a height of 2 and including a root node Y1 and leaf node Y2.

In the entry deleting operation, the change of a page layout is based on only a use ratio of a root node. This is for minimizing overhead due to frequent page layout changes.

The page layout changing algorithm according to the insertion and deletion of entries described above is expressed in pseudo code as follows.

```
1:   R ← get the root not
2:   C ← get the current layout of μ*-Tree
3:   H ← get the current height of μ*-Tree
4:   if (R·entry − R·max or SP(I)/SP(L) > (1 − C·p₁)/(C·p₁)) and
         C·p₁ − α ≥ β then
5:       C·p₁ ← C·p₁ − δ
6:       C·pᵢ ← (1 − C·p₁) / (H − 1), for all i ≥ 2
7:   else if R·entry < (R·max)/2 and C·p₁ + δ ≤ α then
8:       C·p₁ ← C·p₁ + δ
9:       C·pᵢ ← (1 − C·p₁) / (H − 1), for all i ≥ 2
10:  end if
```

The μ*-tree of the inventive concept stores a leaf node, an index node, and a root node in one page of a flash memory, remarkably decreasing the number of writing operations in accordance with the insertion and deletion of an entry. In particular, in an entry inserting or deleting operation, the page layout may be changed according to the number of entries in a leaf node and index (root) node, thereby further minimizing the number of writing operations of a flash memory.

Figure 14:
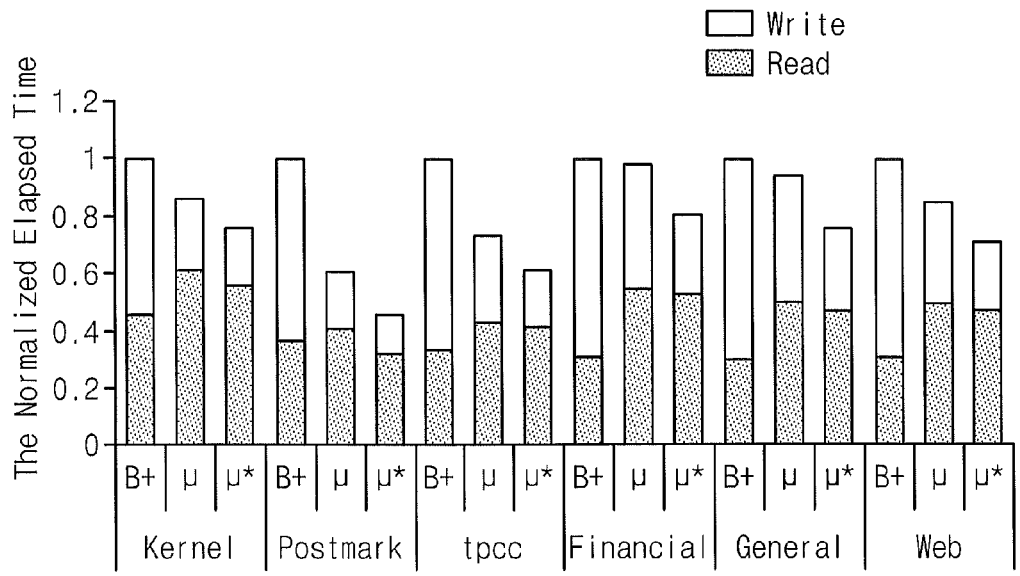
FIG. 14 is a diagram that illustrates benchmark results between a B-tree, a μ-tree, and the μ-tree according to an embodiment of the inventive concept.

FIG. 14 is a diagram illustrating benchmark results between a B-tree, a μ-tree, and the μ*-tree of the inventive concept.

Referring to FIG. 14, it can be seen that in several operation environments (kernel, postmark, tpcc, financial, general, and web), the speed of writing/deleting operations for the μ*-tree according to embodiments of the inventive concept is enhanced relative to the B-tree and μ-tree.

Figure 15:
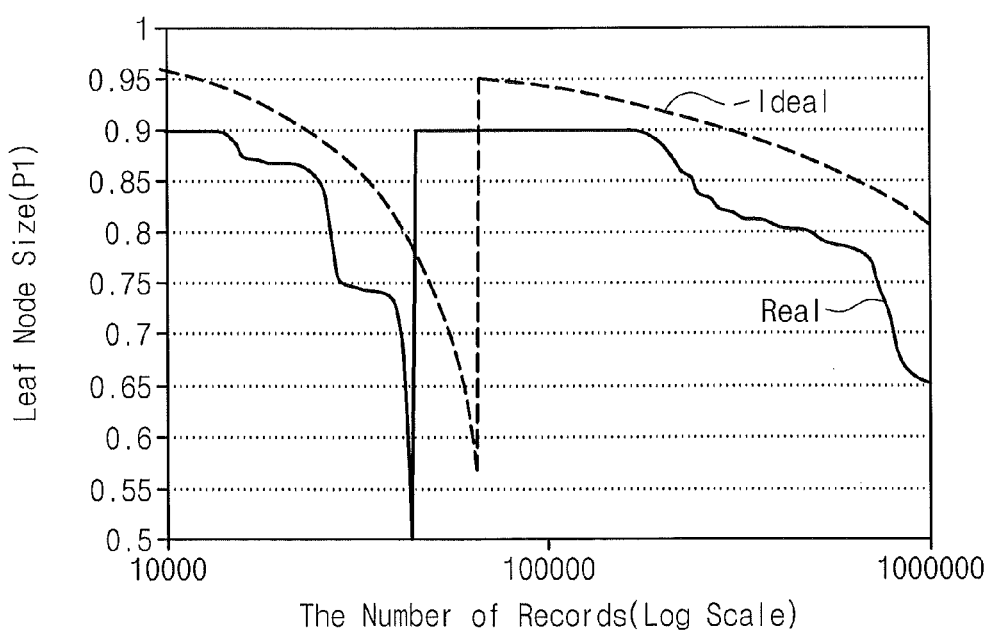
FIG. 15 is a diagram that illustrates change of a size ratio a leaf node occupies in a page of the μ*-tree according to an embodiment of the inventive concept.

FIG. 15 is a diagram illustrating change of a size ratio $p_1$ a leaf node occupies in a page of the μ*-tree according to embodiments of the inventive concept.

Referring to FIG. 15, based on the method of changing a page layout of the μ*-tree, the change of the size ratio $p_1$ a leaf node occupies in a specific page is almost similar to the theoretical optimum value of FIG. 9.

Figure 16:
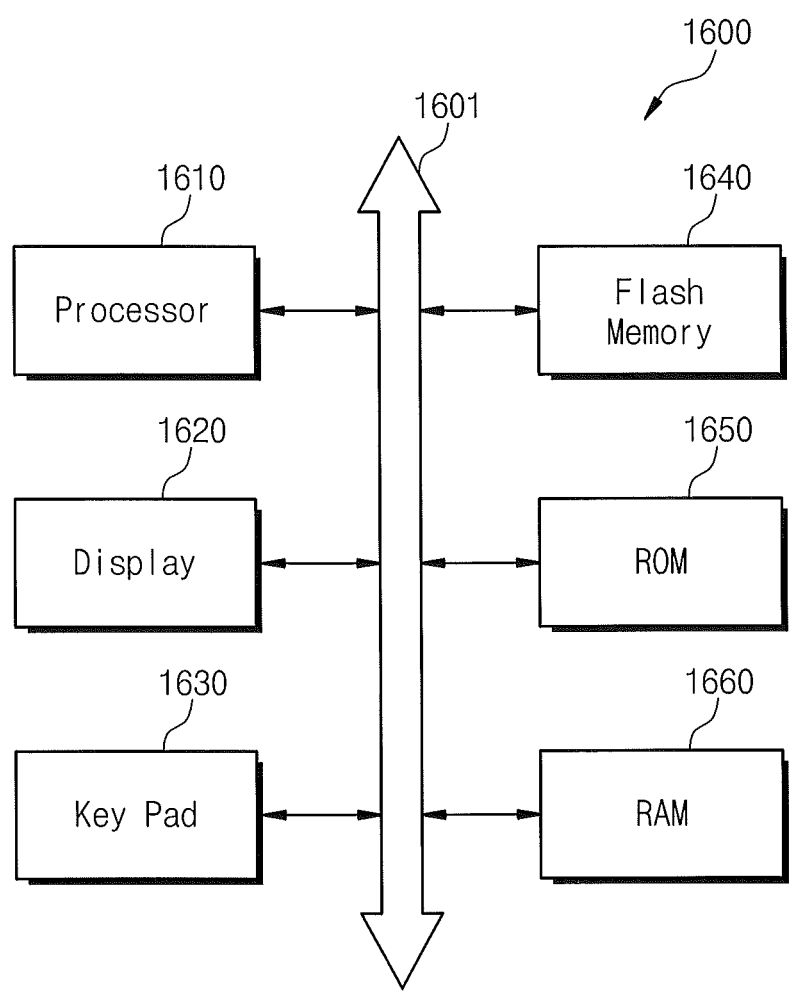
FIG. 16 is a diagram that illustrates a configuration of an electric device adopting the indexing scheme according to an embodiment of the inventive concept.

FIG. 16 is a diagram illustrating a configuration of an electric device adopting the indexing scheme according to an embodiment of the inventive concept.

Referring to FIG. 16, the electric device 1600 includes a processor 1610, a display 1620, a keypad 1630, a flash memory 1640, a read only memory (ROM) 1650, and a random access memory (RAM) 1660, which are connected to a system bus 1601. The electric device having such configuration stores its file system in the flash memory 1640. Herein, the flash memory 1640 adopts the indexing scheme of the embodiments of inventive concept based on the μ*-tree structure. The electric device 1600 may be a device such as a digital music player, digital camera, cell phone, personal computer, portable multimedia player (PMP), or play station.

The processor 1610 may store a leaf node and index nodes related to the leaf node of the μ*-tree in one page of the flash memory 1640 and perform a correction, insertion, or deletion for the leaf/index node. Also, the page layout may be changed in correcting, inserting, or deleting operation on the basis of the number of entries stored in each of the leaf node and index node.

Figure 17:
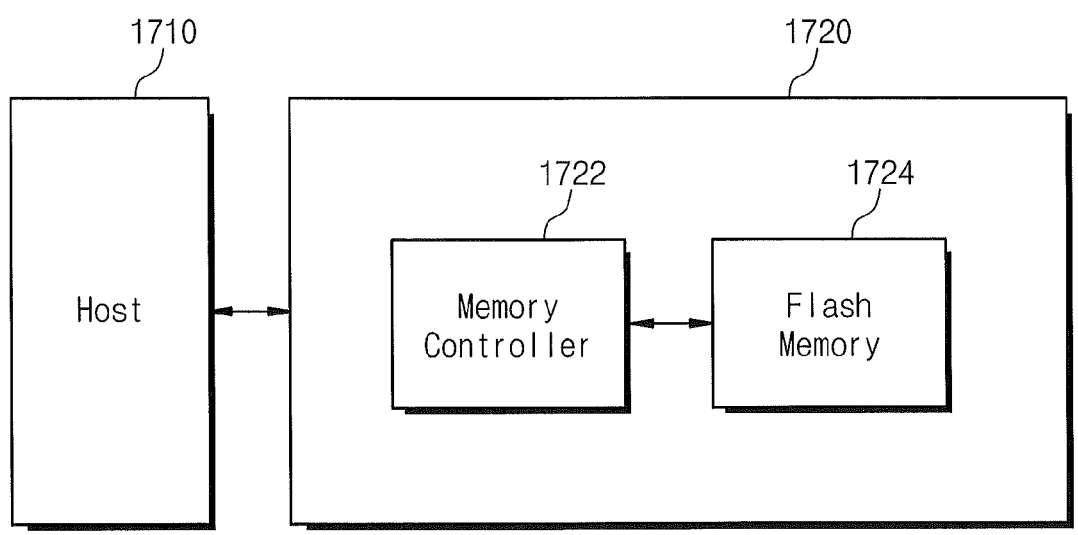
FIG. 17 illustrates a memory system adopting the indexing scheme according to an embodiment of the inventive concept.

FIG. 17 illustrates a memory system adopting the indexing scheme according to an embodiment of the inventive concept.

Referring to FIG. 17, a memory device 1720 is connected to a host 1710. The memory device 1720 includes a memory controller 1722 and a flash memory 1724. The memory controller 1722 provides an interface between the host 1710 and the flash memory 1724. The memory controller 1722 and flash memory 1724 may be configured as one-chip. A compact flash, smart media, memory stick, secure digital card, or multimedia card may be implemented with the one-chip. In such memory system, the host 1710 may access the flash memory 1724 according to the indexing scheme of the inventive concept.

In particular, the memory controller 1722 stores an entry of a leaf node and an entry of an index node designating the leaf node in the same page of the flash memory 1724 in response to a command from the host 1710, and performs a page layout changing operation on the basis of the number of entries of each of the leaf node and index node.

Figure 18:
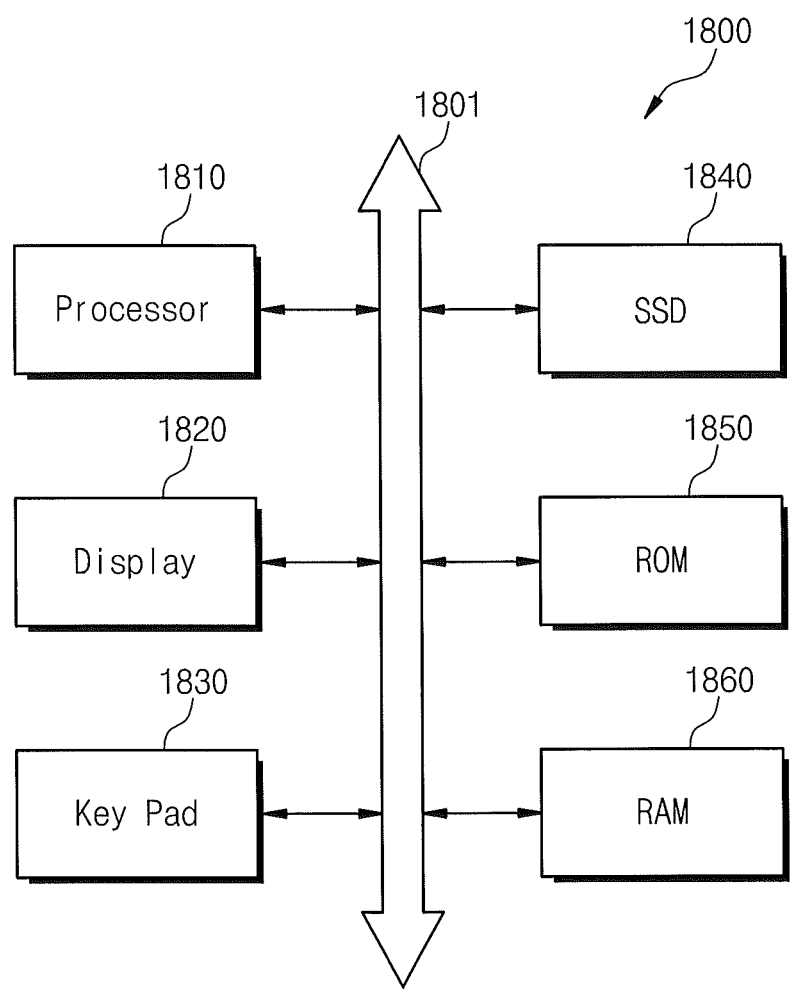
FIG. 18 illustrates another electric device adopting the indexing scheme according to an embodiment of the inventive concept.

FIG. 18 illustrates another electric device adopting the indexing scheme according to an embodiment of the inventive concept.

Referring to FIG. 18, an electric device 1800 includes a solid state disk (SSD) 1840 instead of the flash memory 1640 of the electric device 1600 of FIG. 16. Another configuration and operation of the electric device 1800 are similar to the electric device 1600 of FIG. 16.

The processor 1810 may store a leaf node and index nodes related to the leaf node of the μ-tree in one page of the SSD 1840 and perform correction, insertion, or deletion on the leaf/index node according to the indexing scheme described above. Also, the processor 1810 may change the page layout in a correcting, inserting, or deleting operation, on the basis of the number of entries stored in each of the leaf node and index node.

According to the embodiments of the inventive concept, the leaf node of the μ*-tree and the index nodes related to the leaf node may be stored in one page of the flash memory, and correction, insertion, or deletion may be performed on the leaf/index node. Also, the page layout may be changed in a correcting, inserting, or deleting operation, on the basis of the number of entries stored in each of the leaf node and index node.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. An indexing method based on a tree structure of a flash memory including a plurality of pages, the indexing method comprising:
    receiving a correction command for a leaf node; and
    storing an entry in the leaf node and an entry in an index node designating the leaf node, in a same page,
    wherein,
    the tree structure comprises the leaf node and the index node, and
    the storing of the entry changes a maximum number of entries that are stored in the leaf node of the page and a maximum number of entries that are stored in the index node of the page on the basis of a number of entries in the leaf node and a number of entries in the index node, respectively.

2. The indexing method of claim 1, wherein the flash memory is read and/or written in page units.

3. The indexing method of claim 2, wherein the index node designates at least one leaf node.

4. The indexing method of claim 3, wherein when the page comprises a plurality of index nodes, a top node among the index nodes is a root node.

5. The indexing method of claim 4, wherein when the correction command is a command indicating inserting of a new entry into the leaf node, the storing of the entry further comprises:
    determining whether the leaf node is full;
    dividing the leaf node into first and second leaf nodes when the leaf node is full; and
    inserting the new entry into one of the first and second leaf nodes.

6. The indexing method of claim 5, wherein the storing of the entry further comprises:
    determining whether the index node is full when the leaf node is divided into the first and second leaf nodes;
    determining whether the leaf node has a free space for storing the new entry when the index node is full; and
    changing the maximum number of entries that are stored in the leaf node of the page and the maximum number of entries which are stored in the index node of the page at a predetermined change ratio when the leaf node has the free space.

7. The indexing method of claim 6, wherein the storing of the entry further comprises:
    dividing the index node when the index node is full and the leaf node has no free space for storing the new entry; and
    counting a number of divisions of the index node.

8. The indexing method of claim 7, wherein the storing of the entry further comprises:
    counting the number of divisions of the index node when the leaf node is divided;
    determining whether a ratio of the number of divisions of the index node and a number of divisions of the leaf node is greater than a predetermined value;
    determining whether the leaf node has the free space for storing the new entry when the ratio of the number of divisions of the index node and the number of divisions of the leaf node is not greater than the predetermined value; and
    changing the maximum number of entries that are stored in the leaf node of the page and the maximum number of entries that are stored in the index node of the page to increase the maximum number of entries that are stored in the index node when the leaf node has the free space.

9. The indexing method of claim 8, wherein the determining of the ratio of the number of divisions comprises determining whether (the number of divisions of the index node)/(the number of divisions of the leaf node) is greater than (1−a size ratio of the leaf node)/(a size ratio of the leaf node).

10. The indexing method of claim 4, wherein when the correction command is a command indicating deleting of an entry from the leaf node, the storing of the entry further comprises:
    determining whether the leaf node becomes empty due to the deletion of the entry;
    deleting the leaf node when the leaf node becomes empty;
    determining whether a use ratio of the root node is less than a reference value; and
    changing the maximum number of entries that are stored in the leaf node of the page and the maximum number of entries that are stored in the index node of the page to increase the maximum number of entries that are stored in the leaf node when the use ratio of the root node is less than the reference value.

11. The indexing method of claim 4, wherein the determining of the use ratio comprises determining whether a number of entries stored in the root node is less than 50% of the maximum number of entries stored in the root node.

12. The indexing method of claim 4, wherein a size ratio the leaf node occupies in the page is equal to or less than a first value and is equal to or greater than a second value, and
    the storing of the entry comprises changing the maximum number of entries that are stored in the leaf node of the page and a maximum number of entries that are stored in the root node of the page to change the maximum number of entries that are stored in the leaf node in the range from the first value to the second value.

13. The indexing method of claim 1, wherein each of the plurality of pages stores the maximum number n (n is a positive integer) of entries of the leaf node and the maximum number n (n is a positive integer) of entries of the index node.

14. A system comprising:
    a flash memory comprising a plurality of pages; and
    a processor configured to access the flash memory,
    wherein the processor performs the indexing method of claim 1.

* * * * *